United States Patent [19]

Ida et al.

[11] Patent Number: 4,576,716
[45] Date of Patent: Mar. 18, 1986

[54] METHOD OF PRODUCING WATER TREATMENT MEDIUM AND MEDIUM PRODUCED THEREBY

[75] Inventors: Hiroaki Ida, Uji; Masahiro Fujii, Kyoto; Toshio Haruta, Nagaokakyo, all of Japan

[73] Assignee: Unitika, Ltd., Japan

[21] Appl. No.: 493,433

[22] Filed: May 9, 1983

Related U.S. Application Data

[63] Continuation-in-part of Ser. No. 331,765, Dec. 17, 1981, abandoned.

[30] Foreign Application Priority Data

Dec. 27, 1980 [JP] Japan .................................. 55-186297
Mar. 24, 1981 [JP] Japan .................................. 56-43332

[51] Int. Cl.$^4$ ............................................ B01D 39/04
[52] U.S. Cl. .................................... 210/496; 162/9; 210/505
[58] Field of Search ................. 210/496, 500.1, 503, 210/504, 505, 506, 508; 162/9, 13, 162, 197

[56] References Cited

U.S. PATENT DOCUMENTS

| | | | |
|---|---|---|---|
| 2,549,698 | 4/1951 | Mason .................................. | 210/503 |
| 2,834,730 | 5/1958 | Painter, Jr. et al. ................ | 210/504 |
| 3,158,532 | 11/1964 | Pall et al. ........................ | 210/504 X |
| 3,506,536 | 4/1970 | Jacquelin ........................... | 162/9 X |

Primary Examiner—Frank Spear
Attorney, Agent, or Firm—Barnes, Kisselle, Raisch, Choate, Whittemore & Hulbert

[57] ABSTRACT

A method of producing a water treatment medium comprises the steps of dispersing staple fibers in a dispersive medium liquid, and causing the fibers to flow and vibrate in the liquid so that the fibers are mutually intertwined or entangled to form spherical or spheroidal or discal fiber lumps.

This method is adapted for quantity production, and the resulting fiber lumps are of high quality and provide an improved filtration efficiency and effect in comparison with conventional filter media.

15 Claims, 6 Drawing Figures

METHOD OF PRODUCING WATER TREATMENT MEDIUM AND MEDIUM PRODUCED THEREBY

This is a continuation-in-part of application Ser. No. 331,765 filed Dec. 17, 1981, now abandoned.

BACKGROUND AND SUMMARY OF THE INVENTION

The present invention relates to a method of producing a water treatment medium or filter medium which can effectively deposit microorganisms and like suspended solids for purifying waste water or like fouled liquids, and a water treatment medium produced by the method.

A filter medium for cleansing waste water is required to have working surfaces provided with innumerable minute holes which allow passage of a mother liquor while preventing passage of suspended solids for causing them to be deposited or accumulated on the surfaces. In order to improve the filtering properties of the filter medium, the following requirements must be met.

(1) Increasing the number of the minute holes to provide a higher filtration speed, i.e., to increase the amount of the mother liquor passed.

(2) Enlarging the total area of the working surfaces to increase the amount of solids suspended or accumulated thereon, i.e., to provide a higher filtrability.

Typical filter media heretofore used for purifying waste water include filter paper, filter cloth, ceramic filters, and metallic screens. Since these media provide only a small overall working area for contact with a liquid to be filtered, they cannot afford sufficient capture of suspended solids, hence a low filtrability. Further, attempts to enhance the filtrability of these media would result in an undue reduction in the filtration speed.

Japanese Published Examined Patent Application No. 56-35926 discloses a medium for selective drainage of water which consists of fiber lumps packed in a cylindrical metal net, each fiber lump comprising a multiplicity of staple fibers intertwined or entangled with one another. Although prepared for a different purpose, the fiber lump, if used as a filter medium, can meet the foregoing requirements and eliminate the drawbacks of the conventional filter media. However, the method of making such fiber masses according to this prior art is extremely cumbersome and inapplicable to quantity production, and the product obtained thereby is of low quality. More specifically, this prior art provides a dry-type method in which a multiplicity of staple fibers are first subjected to a special crimping process which may require chemical treatment, heating or application of steam to obtain fixedly crimped fibers. The crimped fibers are then introduced into a cylindrical container in which the fibers are dispersed in air and agitated by a rotary drum having a plurality of agitating blades so that the fibers are intertwined with each other to form spherical fiber lumps.

In the method of this prior art, the fibers are agitated in air and are thus less likely to flex and intertwine with each other since The Young's modulus of the fibers in air is rather high and since air cannot impart complicated movement due to its low viscosity. Thus it is necessary to crimp the fibers before agitation to help the fibers intricately to tangle with each other during the agitating operation. Further, since the clearance formed between the cylindrical container and the rotary drum is extremely small, the amount of staple fibers processed at a time is limited, hence inapplicable to quantity production. Still further, since the fibers are invariably hit directly by the agitating blades, the individual fibers will be greatly damaged and the surfaces of the fiber lumps will be unacceptably rough.

It is therefore an object of the present invention to provide a novel method which is adapted for quantity production and by which high-quality fiber masses are readily obtained, thereby providing an excellent filter medium which overcomes the drawbacks of conventional filter media.

To fulfill this object, the present invention provides a method of producing a water treatment medium comprising the steps of dispersing staple fibers in a dispersive medium liquid, and causing the fibers to flow and vibrate in the liquid so that the fibers are mutually intertwined or entangled to form spherical or spheroidal fiber lumps.

According to this method, since the fibers are immersed in a liquid, e.g., water, they readily flex due to a reduced Young's modulus. Further, since a liquid has a much higher viscosity than air, the fibers floating in the medium liquid flex intricately in line with the complicated movement of the liquid. Thus the fibers closely and complicatedly intertwine with each other in the medium liquid without the necessity of crimping them prior to agitation. Further, since the fibers float in the liquid, there is substantially no likelihood of the fibers being damaged as by a stirrer, thus ensuring a high quality of the formed fiber lumps.

According to a preferred embodiment of the present invention, an adhesive is added to the medium liquid so that the formed fiber lumps will not get disentangled.

The present invention also provides a filter medium produced in accordance with this novel method.

These and other features and effects of the present invention will be readily understood from the description of embodiments given with reference to the accompanying drawings.

DETAILED DESCRIPTION

Figure 1:
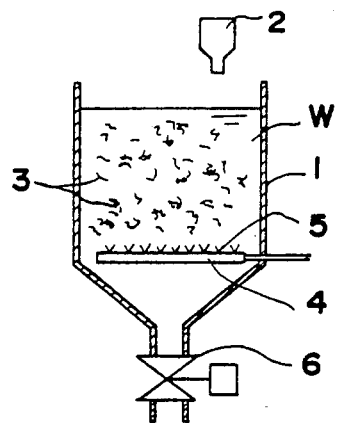
FIG. 1 is a schematic view of a fiber lump making apparatus for carrying out a first method embodying the invention.

Fiber lumps adapted for use as a filter medium can be prepared by dispersing a plurality of staple fibers in a dispersive medium liquid, e.g., water, and thereafter causing the fibers to flow and vibrate in the medium liquid by the following methods.

(A) Introducing air streams into the liquid.
(B) Stirring the liquid by agitation blades.
(C) Forming a stream of the medium liquid by a pump.

The method (A) and an apparatus therefor will now be described with reference to FIG. 1.

An appropriate amount of staple fibers 3 are supplied through a feeding hopper 2 into water W stored in a vessel 1 and dispersed. Air is fed into the water W through an air nozzle 4 arranged in the lower portion of the vessel 1, so that rising streams of air 5 are formed. The streams of air 5 cause the fibers 3 to flow and vibrate in the water W. As a result, the fibers 3 fold and bend. If continuously acted on by the air streams 5, adjacent fibers 3 collectively intertwine with each other to form a spherical or spheroidal or discal fiber mass of 5 to 100 mm in diameter. The fiber masses thus formed are discharged through a closable discharge opening 6 at a constant time interval.

Formation of fiber lumps occurs with fibers of any material, and the size, shape and inner structure of fiber lumps depend on the methods of production and the physical properties of individual fibers, such as thickness, length, Young's modulus, rigidity, density and friction coefficient. Materials for the staple fibers 3 thus include natural fibers, regenerated cellulosic fibers, organic fibers such as synthetic fibers, and inorganic fibers such as glass fibers, metallic fibers and mineral fibers, and should be chosen according to the requirements of a specific application. To mention specific examples of suitable materials for the staple fibers 3, polyester, polyamide, polyvinyl alcohol and, acrylonitrile are advantageous in view of durability during treatment in water, and rayon and polyester are preferred in view of processability.

Figure 2:
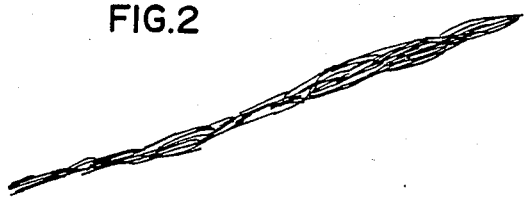
FIG. 2 is a view showing a model of a stick-form fiber strand unusable as a filter medium.

The fibers 3 should be agitated in the water W for at least 10 minutes, preferably not less than 30 minutes, to obtain sufficiently intricate intertwining connections between the individual fibers. Further, the fibers 3 should have a staple length of 5 to 50 mm since fibers of less than 5 mm in length would hardly produce fiber lumps while fibers of more than 50 mm in length would form tightly entangled fiber strands of more than 20 cm in length, as shown in FIG. 2. Such strands would be unusable as a filter medium.

Figure 3A:
FIG. 3a is a schematic view of a spheroidal fiber lump.
Figure 3B:
FIG. 3b is a schematic view of a spherical fiber lump.

The diameter of the individual fibers 3 may vary depending on Young's modulus of the material used but generally should be kept within 10 to 100$\mu$. Within this range, if the fibers 3 have a thicknss of not more than 10 deniers (about 30$\mu$ in diameter), spheroidal fiber lumps of about 30 mm in maximum diameter illustrated in FIG. 3a will be obtained, while if the fibers 3 have a fineness of not less than 15 deniers (about 40$\mu$ in diameter), spherical fiber masses of about 20 mm in diameter shown in FIG. 3b will be produced. The individual fibers 3 usually have a circular cross-section, but may have a cross section of other shapes, such as triangular star-form.

The water W may be replaced by ethylene glycol, ethanol, butanol or other like liquids. A dyestuff, together with a dyeing assistant if necessary, may be added to the dispersive medium liquid to dye the fiber lumps as desired. Further an adhesive may also be added to the medium liquid so as to prevent the disentanglement of formed fiber lumps.

The temperature of the water W should be maintained constant at not less than 10° C., preferably 20° to 80° C. A low temperature is not preferred since the fibers 3 are less likely to flex. A constant temperature insures uniformity of fiber lump diameters.

Since streams of air are introduced into the water W in the method (A) of FIG. 1, the temperature of the water may fluctuate during agitation, consequently involving a difficulty of temperature adjustment. The methods (B) and (C) have been conceived in view of this problem and will now be briefly described with reference to FIGS. 4 and 5.

Figure 4:
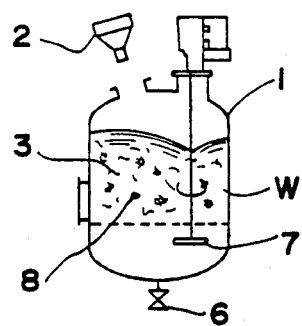
FIG. 4 is a view similar to FIG. 1 showing fiber lump making apparatus for carrying out a second method of the invention.

Referring to FIG. 4, staple fibers 3 fed through a feeding hopper 2 are caused to flow and vibrate by stirring water W in a vessel 1 with agitation blades 7 so that fiber masses 8 are formed.

Figure 5:
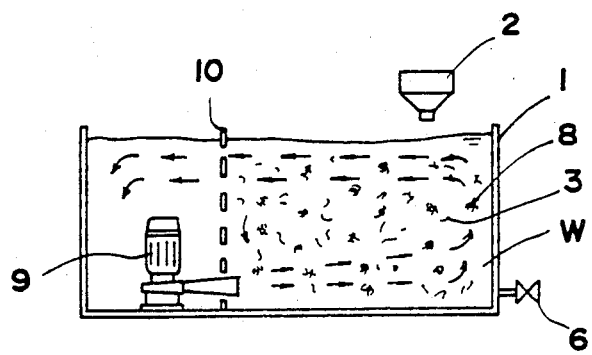
FIG. 5 is a view similar to FIG. 1 showing fiber lump making apparatus for carrying out a third method of the invention.

In the method (C) of FIG. 5, staple fibers 3 are caused to flow and vibrate by vigorously circulating dispersive medium water W by means of a pump 9.

The degree of agitation, either by the agitation blades 7 or by the pump 9, is such that the water W is at least brought into a turbulent state. The various conditions mentioned in connection with the method (A) are also applicable to the methods (B) and (C).

With regard to the method (B), although there are no definite requirements as to the shape of the blades 7, blades of a simpler shape such as propeller-type, paddle-type, or anchor-type are preferred to blades of a complicated shape such as helical blades in that the latter are more likely to cause the fibers 3 to twine therearound. In this respect, the stirrer of a domestic washing machine is particularly advantageous since it has smoothly projecting blades.

Instead of providing the stirrer 7, the vessel 1 may be of the rotary type with interior baffle plates as in the case of a concrete mixer or a spherical rotary container. Further, a vibrator can also be employed as agitating means.

In connection with the method (C), a filter 10 should be arranged so that the fibers 3 will not clog up the pump 9. Alternatively, a non-clog type pump should be used as the pump 9.

All the methods, as opposed to the prior art method, are extremely simple and adapted for quantity production, and the fiber lumps produced thereby have a uniform and high quality since the fibers are agitated indirectly via a viscous medium liquid, e.g., water, but not directly by some agitating means. Since each fiber lump has an enormous number of minute water holes and large working surfaces arranged three-dimensionally, it can serve as an excellent filter medium having a high filtration speed and a high filterability.

As stated before, since fiber lumps produced according to the prior art method have a rough outer surface with some fibers projecting as fluff, they are not mutually separable by entanglement of the projecting fibers when packed in a filter tower. Thus the prior art fiber lumps are not amenable to backwash or blowback for cleaning since the individual fiber lumps cannot float and move about freely in spite of the low apparent density thereof.

Since fiber lumps made in accordance with the present invention, on the other hand, have a smooth outer surface and a low apparent density, they can be readily backwashed for repeated use as a filter medium.

The fiber lumps of the present invention can be used for submerged biological filtration or trickling filtration.

Specific examples of the methods according to the present invention will now be given for a better understanding.

EXAMPLE I 400 l of water was placed in a vessel of 1.2 m in diameter and 1.5 m in height and adjusted to a temperature of 40° C. Pfauder type agitating blades were mounted in the vessel and rotated at 60 rpm. 50 Kg of polyester fibers having a thickness of 20 deniers (45μ in diameter) and cut to a length of 15 mm were fed and dispersed in the water. After continuously agitating the water by the blades for 45 minutes, fiber lumps of 15 to 30 mm in diameter were obtained. The fiber lumps were usable as a filter medium.

EXAMPLE II 50 l of hot water having a temperature of 60° C. was poured into a domestic washing machine. 0.8 Kg of non-crimped polyester fibers having a thickness of 8 denier (28μ in diameter) and cut to a length of 20 mm were subsequently dispersed in the water and mildly stirred in the washing machine for 30 minutes. The individual fibers had a circular cross-section. As a result, the fibers formed into generally spherical fiber lumps of 10 to 25 mm in diameter.

For comparison, the same operation as above was repeated except that crimped polyester fibers cut to a length of 64 mm were used. The fibers were not formed into small spherical fiber lumps but into 500 mm long fiber strands as shown in FIG. 2 or extremely large fiber lumps.

EXAMPLE III

4 Kg of rayon fibers having a thickness of 10 deniers (31μ in diameter) and cut to a length of 20 mm were fed into a 1 m dia. spherical rotary vessel containing water at a normal temperature, which container was then rotated at a speed of 30 rpm for 30 minutes. As a result, fiber lumps having diameters of 10 to 30 mm were produced.

EXAMPLE IV

A stirrer having a rubber plate blade of 10 cm in width and 20 cm in height was mounted in a cylindrical stainless steel vessel of 30 cm in diameter and 30 cm in height. 8 l of water was supplied into the vessel which was then immersed in a hot water bath having a temperature of 80° C. Subsequently 200 g of nylon staple fibers having a length of 20 mm and a thickness of 20 deniers (60μ in diameter) were fed into the vessel and the stirrer was rotated at a speed of 90 rpm for 30 minutes. The resulting fiber lumps had diameters of 15 to 25 mm.

EXAMPLE V

In order to see the usability, as a filter medium, of fiber lumps obtained from staple fibers of varying lengths, 50 kg each of polyester fibers having a thickness of 15 deniers (39μ in diameter) and cut to a length of 5 mm, 10 mm, 15 mm, 20 mm, 30 mm, 40 mm, 50 mm, 60 mm, respectively, were made into lumps by the same apparatus as in Example I. The result is shown in Table I below.

TABLE I

| Fiber Length (mm) | 5 | 10 | 15 | 20 | 30 | 40 | 50 | 60 |
|---|---|---|---|---|---|---|---|---|
| Duration of Agitation (hour) | 24 | 10 | | 3 | | | 2 | |
| Yield (%) | 10 | 55 | 88 | | | 90 or more | | |
| Shape of Lumps | | Discal or Spherical | | | | Spherical | | Strand |
| Diameter or Length of Lumps (mm) | 5 | 10–15 | 15–30 | 30–50 | 50–60 | 60–100 | | 300 |
| Usability as Filter Medium | □ | | ○ | | | Δ | X | X |

: Usable as a filter medium
Δ: Unusable as a filter medium due to low filtration of suspended solids
X: Unusable as a filter medium due to extremely low filtration of suspended solids
○: Unusable as a filter medium due to loss of fiber lumps through the pores of a perforated supporting plate or due to clogging up by suspended solids of the supporting plate pores reduced in diameter to prevent such loss of fiber lumps
□: Not advantageous in view of low yield and required duration of agitation for manufacture From Table I, it is concluded that the fiber lumps obtained from fibers of 15–30 mm in length can be most advantageously used as a filter medium.

What is claimed is:

1. A method of producing a depth-type filtration medium adapted for repeated use by backwash comprising the steps of dispersing non-crimped staple fibers 15 to 30 mm in length in a dispersive medium liquid, and causing the fibers to flow and vibrate in the liquid so that the fibers will fold and bend and become mutually intertwined or entangled to form spherical or spheroidal or discal fiber lumps of non-crimped fibers, said fibers being made of material selected from the group consisting of the polyester family, the polyamide family, the polyvinyl alcohol family, acrylonitrile, rayon, and any combination thereof.

2. A method as defined in claim 1 wherein the fibers are caused to flow and vibrate by introducing air streams into the dispersive medium liquid.

3. A method as defined in claim 1 wherein the fibers are caused to flow and vibrate by stirring the medium liquid with an agitator.

4. A method as defined in claim 1 wherein the fibers are caused to flow and vibrate by forming a stream of said medium liquid by means of a pump arranged in said medium liquid.

5. A method as defined in claim 1 wherein the medium liquid is water.

6. A method as defined in claim 1 wherein the individual fibers have a diameter of 10 to 100μ.

7. A method as defined in claim 1 wherein the temperature of the medium liquid is maintained constant at not less than 10° C.

8. A method as defined in claim 1 wherein the fibers are allowed to flow and vibrate for at least 10 minutes.

9. A method as defined in claim 1 wherein an adhesive is added to the medium liquid to strengthen the intertwining connections between the fibers.

10. A method as defined in claim 1 wherein a dyestuff is added to the liquid medium.

11. A medium as defined in claim 10 wherein a dyeing assistant is added to the liquid medium.

12. A method as defined in claim 1 wherein the temperature of the medium liquid is maintained constant at 20° to 80° C.

13. A method as defined in claim 1 wherein the fibers are allowed to flow and vibrate for not less than 30 minutes.

14. A depth-type filtration medium adapted for repeated use by backwash consisting of a spherical or spheroidal or discal fiber lump or lumps of non-crimped fibers obtained by causing non-crimped staple fibers 15 to 30 mm in length to flow and vibrate in a dispersive medium liquid so that the fibers will fold and bend and become mutually intertwined or entangled, said fibers being made of material selected from the group consisting of the polyester family, the polyamide family, the polyvinyl alcohol family, acrylonitrile, rayon, and any combination thereof.

15. A medium as defined in claim 14 wherein the individual fibers have a diameter of 10 to 100μ.

* * * * *